Figure 1:
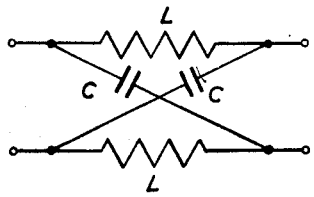

Feb. 21, 1956 J. A. GIARO 2,735,897
METHOD OF BALANCING TELEPHONE CABLES, MEANS OF CARRYING
OUT SAME AND CABLES BALANCED BY SAID METHOD
Filed June 11, 1952

Inventor
JOSEPH A. GIARO
By Philip M. Bolton
Attorney

United States Patent Office 2,735,897
Patented Feb. 21, 1956

2,735,897

METHOD OF BALANCING TELEPHONE CABLES, MEANS OF CARRYING OUT SAME AND CABLES BALANCED BY SAID METHOD

Joseph Antoine Giaro, Marcinelle, Belgium, assignor to International Standard Electric Corporation, New York, N. Y., a corporation of Delaware Application June 11, 1952, Serial No. 292,941

Claims priority, application Belgium June 21, 1951

2 Claims. (Cl. 179—78)

This invention relates to a method of balancing a carrier current communication cable.

It is well known that in order to provide an effective balance of cables with symmetrical pairs, that it is necessary for the interfering and the disturbed circuits to have the same value of phase constant.

This condition becomes more important as the range of frequencies to be transmitted becomes wider, and it must be applied to all the circuits of the cable concerned, in view of the fact that the frequencies employed at the present time, which rises to about 250 kc./s. there are no longer any free coupling circuits of any kind whatsoever.

In order to overcome this drawback it has already been proposed in British Patent No. 666,688, published on February 20, 1952, issued to Stieltjes, systematically to mix the pairs or quads forming the electrical circuits connected between two repeater stations. This method is based on the observation that the difference of the phase constants of the various pairs of a manufacturing length of cable is to a great extent due to the difference of pitch of twisting of said pairs.

It has been found in practice however that this means is insufficient and considerable differences have been noted between the phase angles of the circuits of an amplification section balanced in accordance with said British patent.

The method described in said British patent does not give the desired result because the phase constants of a cable section depend not only on the pitch of twist of the pairs or quads of the cable but also on a number of other causes to a great extent of a problematical nature.

The object of the present invention is to provide a method of balancing and jointing which makes it possible to reduce the differences of the phase angles of the electrical circuits of an amplifier section of a carrier current cable with symmetrical pairs, substantially to the extent desired, and also the technical means of doing so.

According to the present invention, there is described a method of balancing a carrier current communication cable, in which the pairs or quads of manufactured lengths of cable are connected together in order to form electrical circuits in such a way that the phase angle of each circuit is equal. Measurements are made of the phase angles on all the pairs or electrical circuits in general of all the manufacturing lengths which have to be jointed together to form an amplifier section.

The cables are then arranged along the route and the circuits to be connected in each junction box are selected in such a way that the sums of the phase angles of the electrical circuits of the manufacturing lengths making up a complete electrical circuit of a repeater section are the same, in other words that all the electrical circuits of a cable between two repeater stations have the same phase angles or the same mean value of the wave length constant.

Instead of carrying out the measurements of the absolute values of the phase angles serving as a basis for the above groups, it is possible in accordance with the present invention to carry out only the measurements of their differences in relation to any value whatsoever, for example in relation to the value of the phase angle of an arbitrarily chosen circuit.

Instead of the phase angles or their differences it is also possible in accordance with the present invention to measure any parameter of the phase angle or to its difference in relation to the value chosen as reference value.

The groupings of the circuits of the manufacturing lengths in order to form the circuits of a repeater section in accordance with the present invention may be made either independently of the grouping of the cables in accordance with their impedance characteristics, or in combination with the latter to obtain the greatest possible homogeneity for the electrical properties of each of the electrical circuits of the cable between two repeater stations.

According to the invention the measurements taken as a basis for the grouping of the circuits of the manufacturing lengths may be carried out in the factory before the shipment of the cables or at the depot and even under certain conditions after the cables have been laid.

In the latter case in order to establish the order of laying of the cable sections, the grouping with the object of equalising the characteristic impedance of the cables must be prepared independently of the grouping which is the object of the present invention and having as its object the constancy of the phase angle.

The efficiency of the balancing of the phase angles in accordance with the method indicated above depends to a certain extent upon the number of circuits (pairs or quads) of the cable, on the number of manufacturing lengths per repeater section and on the dispersion of the values of the phase angles. If the number of circuits among which the choice is made for balancing be low or if the degree of equalisation required be too high it is possible in accordance with the present invention to carry out an additional balancing by means of the dephasing or compensating elements. This additional balancing may be considered under certain conditions as the principal balancing.

It is possible to use as dephasing or compensating element any kind of 4 terminal network of which the attenuation is zero or low in relation to its phase angle. The characteristic impedance of the compensation 4 terminal network must be near but not necessarily equal to that of the cable, since the reflections due to the difference of the characteristic impedances are all the less, the lower the attenuation or the propagation constant of the 4 terminal network in question.

As an example the lattice network shown in Figure 1, is composed of two capacities C, and two inductances L, but any other 4 terminal network, for example, of the T, or π, or of the combined type composed of inductances, capacities and even of resistances, may be employed in accordance with the present invention for the compensation of the phase angles of the carrier current cables, in as much as it fulfils the conditions mentioned above relating to the attenuation and the characteristic impedance.

The compensation 4 terminal network can also, in accordance with the present invention, have either fixed elements, or one or more variable elements. The shape and mechanical construction of the elements of the 4 terminal network and their mutual arrangement are also unimportant from the standpoint of the present invention.

It is possible for example to employ self inductances with or without magnetic cores, two or more self inductances on the same core, air or mica condensers, separately or simultaneously variable.

The compensation 4 terminal network may be installed in accordance with the invention either at one of the ends of the amplification section or at any other point of the line, for example in the middle.

Figure 2:
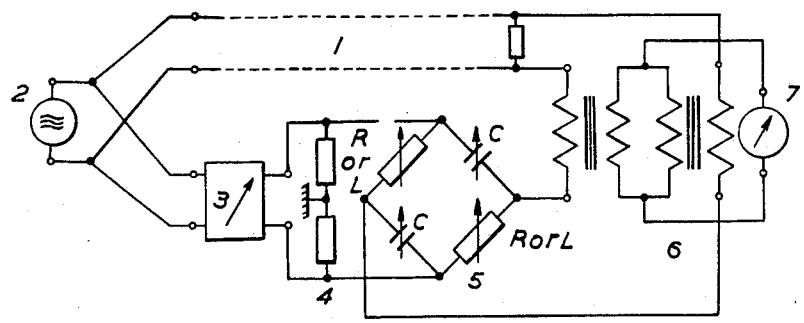
Figure 3:
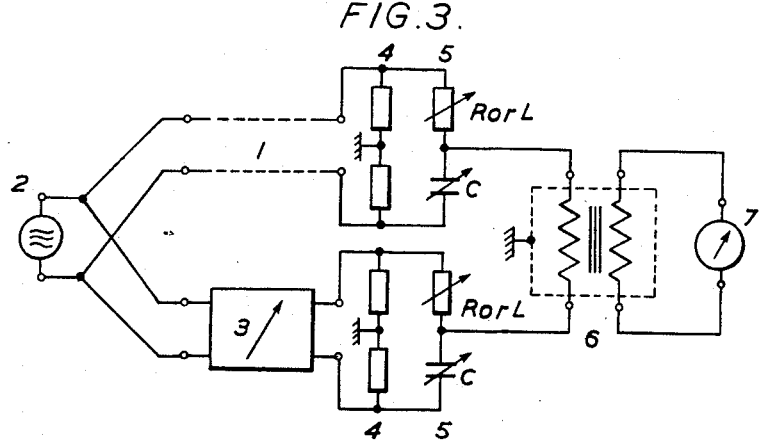

The measurements of the phase angles, of their differences or of their magnitudes which are in proportion to them, which serve as a basis for the groupings of the pairs or quads of the cable, can be carried out in accordance with the present invention preferably with the apparatus shown in Figures 2 and 3 but any other suitable device may also be employed in accordance with the invention.

In Figures 2 and 3 reference 1 designates the cable to be measured represented by a single pair, 2 the source of current, 3 an artificial line graduated in nepers or decibels, 4 adaptation or impedance matching bridges formed by two impedances of suitable value, 5 dephasing bridges formed of condensers and self inductances or of variable resistances, 6 a compensating transformer and 7 an amplifier with zero indicator or a heterodyne with receiver.

One of the characteristics of these measuring devices consists in accordance with the present invention of the existence of the adaptation or impedance matching bridge designated by 4. The impedances of this bridge are chosen in such a way that they give with the impedances of the dephasing bridge an input impedance which is equal or approximately equal to the characteristic impedances of the artificial line or of the cable to be measured and this within the whole range of frequencies concerned.

In any case the variations of the input impedance of the assembly formed by the adaptation bridge and the dephasing bridge are such that they can be disregarded because they have no substantial influence on the accuracy of measurement.

The method of balancing described above may be employed independently of all the other methods of balancing phase angles or in combination with one or more others, as for example with the method of said British patent while forming the object of the present invention.

In order that the balancing of carrier current cables may achieve its final purpose, that is to say to the greatest extent possible it may render the cable free from all harmful currents interfering with the transmission of the useful signals generally and from cross-talk in particular. This balancing must be made from different standpoints, such for example, as the suppression or reduction of reflections of asymmetrical couplings, the reduction of near-end cross-talk at the input and output of the cable etc. Of course the method of balancing proposed by the present invention only has the object of equalising phase angles which being of paramount importance does not exclude and even should be carried out simultaneously with other types of balancing, for example with the balancing with the object of suppressing asymmetrical couplings etc. while forming the object of the present invention.

With the object of forming for all the electrical circuits between two amplification stations, equal sums for the phase angles, it is possible to employ any working technique whatsoever by employing for example suitable tables and card indices, mobile graphic representations or calculating machines while remaining within the scope of the present invention.

In the case of simultaneous grouping in accordance with the characteristic impedances and the phase angles the use of a mobile graph with two ordinates is to be recommended.

While the principles of the invention have been described above in connection with specific embodiments, and particular modifications thereof, it is to be clearly understood that this description is made only by way of example and not as a limitation on the scope of the invention.

What we claim is:

1. A method of installing a carrier current communication cable, comprising measuring the phase shift along each pair or quad of each manufacturing length of cable, where the propagation constant of a line is $A+jB$, $B$ being the phase shift per unit length, and connecting the quads or pairs of successive manufacturing lengths together, to make the phase shifts of the total lengths of each of said pairs or quads approximately equal.

2. The method according to claim 1 and further comprising connecting a four terminal network between said quads or pairs for compensating any residual phase shift differences therebetween, said network being designed to have a low attenuation and a characteristic impedance equal to that of said quads or pairs.

References Cited in the file of this patent

UNITED STATES PATENTS

| | | |
|---|---|---|
| 1,720,616 | Werren | July 9, 1929 |
| 2,373,906 | Mouradian | Apr. 17, 1945 |
| 2,675,428 | Stieltjes | Apr. 3, 1954 |